(12) United States Patent
Vedula et al.

(10) Patent No.: US 8,148,475 B2
(45) Date of Patent: *Apr. 3, 2012

(54) MELT SPUN POLYETHER TPU FIBERS HAVING MIXED POLYOLS AND PROCESS

(75) Inventors: Ravi R. Vedula, North Ridgeville, OH (US); Yona Eckstein, Kent, OH (US); Yinbing Xia, Beijing (CN); James E. Bryson, Jr., Greenville, SC (US); Christopher A. Sprague, Cuyahoga Falls, OH (US); Julius Farkas, North Ridgeville, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 1000 days.

This patent is subject to a terminal disclaimer.

(21) Appl. No.: 10/880,001

(22) Filed: Jun. 29, 2004

(65) Prior Publication Data
US 2004/0266301 A1  Dec. 30, 2004

Related U.S. Application Data

(60) Provisional application No. 60/483,823, filed on Jun. 30, 2003.

(51) Int. Cl.
*C08G 18/10* (2006.01)
*C08G 18/48* (2006.01)
*C08J 3/24* (2006.01)

(52) U.S. Cl. ............ 525/458; 364/211.12; 364/211.22; 525/457

(58) Field of Classification Search .......... 528/65, 528/906, 79; 428/364; 525/457, 458; 264/211.12, 264/211.22
See application file for complete search history.

(56) References Cited

U.S. PATENT DOCUMENTS

| | | | |
|---|---|---|---|
| 4,131,731 A | | 12/1978 | Lai et al. |
| 4,485,719 A | * | 12/1984 | Mendelsohn et al. ....... 89/1.816 |
| 4,739,027 A | * | 4/1988 | Mendelsohn et al. .......... 528/60 |
| 5,171,633 A | * | 12/1992 | Muramoto et al. ........... 428/374 |
| 5,959,059 A | * | 9/1999 | Vedula et al. .................... 528/76 |
| 6,186,970 B1 | * | 2/2001 | Fujii et al. ........................ 602/75 |
| 6,277,942 B1 | | 8/2001 | Foss |
| 6,709,147 B1 | | 3/2004 | Rauwendaal |
| 6,824,703 B2 | * | 11/2004 | Lawrey et al. ........... 252/182.25 |
| 7,357,889 B2 | * | 4/2008 | Vedula et al. ............ 264/172.17 |
| 2002/0161159 A1 | * | 10/2002 | Vedula ............................ 528/44 |
| 2003/0028952 A1 | * | 2/2003 | Fujii et al. ........................ 2/400 |

FOREIGN PATENT DOCUMENTS

| | | | |
|---|---|---|---|
| CN | 1 410 605 A | | 4/2003 |
| EP | 0972864 | * | 1/2000 |
| EP | 1 273 606 A | | 1/2003 |
| JP | 2003-082057 A | | 3/2003 |
| WO | WO 99/14252 A1 | | 3/1999 |
| WO | WO 03/010216 A1 | | 2/2003 |

* cited by examiner

*Primary Examiner* — Rabon Sergent
(74) *Attorney, Agent, or Firm* — Christopher D. Hilker; Joe A. Powell

(57) ABSTRACT

Thermoplastic polyether polyurethane polymers are disclosed which are mixed with a crosslinking agent to achieve long run times in a melt spinning process to make elastic fibers. The crosslinking agent is preferably a polyether or polyester polyol reacted with a diisocyanate. A melt spinning process is also disclosed using a polyether polyurethane with a crosslinking agent. Long melt spinning run times can be achieved without experiencing excessive pressure buildup in the spinneret and fiber breakage. The thermoplastic polyether polyurethane polymers are made by reacting: (1) a blend of two or more hydroxyl terminated intermediates wherein one intermediate is a polyether intermediate and has a higher number average molecular weight than the other said polyether intermediates, and wherein the weighted average number average molecular weight of said blend is greater than 1200 Daltons; (2) at least one polyisocyanate; and (3) at least one hydroxyl terminated chain extender. Melt spun fibers disclosed have excellent dye pickup, bleach resistance, and color fastness. The melt spun fibers can be dyed with polyester fibers and retain excellent physical properties.

13 Claims, No Drawings

MELT SPUN POLYETHER TPU FIBERS HAVING MIXED POLYOLS AND PROCESS

CROSS REFERENCE

This patent application is filed pursuant to and claims priority from Provisional Application No. 60/483,823 filed on Jun. 30, 2003.

FIELD OF THE INVENTION

The present invention relates to thermoplastic polyurethane (TPU) compositions for making melt spun elastic fibers, such as spandex having improved resistance to bleach, and able to withstand dyeing conditions of polyester fibers. The invention also relates to process to produce melt spun TPU fibers where the run time is greatly increased before experiencing fiber breakage.

BACKGROUND OF THE INVENTION

The vast majority of TPU fibers are made by a dry spinning process involving dissolving the TPU in solvent. The melt spinning process to produce TPU fibers has several inherent advantages including less cost, less capital cost, and less environmental concerns as a result of not using volatile solvents. Dry spun fibers are made from a TPU having urea linkages. Therefore, the dry spun fibers are heat resistant, but this type of TPU cannot be melt spun as it will not melt. Also, typical spandex TPU fibers without modification are attacked by bleach and suffer from a loss of tenacity and power when exposed to bleach or chlorinated swimming pools. Typical unmodified spandex has low dye pickup with dispersive dyes and has poor wet fastness.

TPU compositions for making melt spun fibers contain a TPU polymer made from a hydroxyl terminated intermediate which is typically a polyether or polyester end capped with a hydroxyl group; a polyisocyanate, such as a diisocyanate; and a hydroxyl terminated chain extender. The hydroxyl terminated intermediate forms the soft segment of the TPU polymer while the polyisocyanate and the chain extender forms the hard segment of the TPU polymer. The combination of soft and hard segments give the TPU polymer elastic properties. The TPU polymer is also frequently lightly cross linked by using a pre-polymer end capped with a polyisocyanate. The cross linking material is added to the melted TPU polymer during spinning.

Polyester and polyether based TPU have both been used in melt spinning TPU fibers. Polyether based TPU fibers can be made to have better hydrolytic stability than TPU fibers made from polyester based TPU.

Polyether TPU fibers have better properties if the polyether hydroxyl terminated intermediate used to make the TPU is higher in molecular weight. Unfortunately, polyether TPU's using a higher molecular weight hydroxyl terminated intermediate tend to have a shorter run time before experiencing pressure build up in the spinneret, thus leading to fiber breakage. When fibers break in a spinning operation, the production line must be shut down and the spinneret cleaned. This is a costly down time and production is lost.

It would be desirable to be able to use TPU polymers which are made from a polyether intermediate having higher molecular weight while retaining the long run time of TPU made with a low molecular weight polyether intermediate.

It would also be desirable to have melt spun TPU fibers which have good resistance to bleach, good dye pickup, color fastness and able to withstand the dyeing conditions of polyester fibers.

SUMMARY OF THE INVENTION

It is an object of the present invention to be able to use a thermoplastic (TPU) made from a higher molecular weight polyether hydroxyl terminated intermediate for melt spinning TPU fibers while achieving long run times before experiencing fiber breakage.

The TPU polymer comprises the reaction of: (a) a blend of at least two hydroxyl terminated intermediates having different number average molecular weights, with the first hydroxyl terminated intermediate being a polyether and present in larger amounts than the second hydroxyl terminated intermediates and having a higher number average molecular weight than the second hydroxyl terminated intermediate. The second hydroxyl terminated intermediate can be a polyether, polyester, polycaprolactone, polycarbonate, and mixtures thereof. Preferably, the second hydroxyl terminated intermediate is a polyether. The weighted average number average molecular weight of the two or more hydroxyl terminated intermediate is at least 1200 Daltons, preferably from 1200 to 4000 Daltons, and more preferably 1500 to 2500 Daltons; (b) at least one polyisocyanate, preferably a diisocyanate; and (c) at least one aromatic hydroxyl terminated chain extender.

The TPU polymer is lightly crosslinked by adding at least one crosslinking agent made from (a) a hydroxyl terminated polyol selected from the group consisting of polyether, polyester, polycaprolactone, and polycarbonate, and mixtures thereof, and (b) a polyisocyanate. Preferably, the polyol is a polyester or polyether polyol and the polyisocyanate is a diisocyanate. The crosslinking agent has an isocyanate functionality greater than 1.0 and preferably from about 1.5 to 2.5 and more preferably an isocyanate functionality of about 1.8 to 2.2.

Melt spun TPU fibers are made by melting the TPU polymer in an extruder and adding the crosslinking agent to the melted TPU. The TPU polymer melt with crosslinking agent is fed to a spinneret. The melt exits the spinneret in the form of fibers. The fibers are cooled and wound onto bobbins.

The process using a blend of different number average molecular weights of hydroxyl terminated intermediates for making the TPU with a crosslinker exhibits much less pressure buildup in the spinneret thus allowing the melt spun fibers to be made in a continuous process for extended periods of time without fiber breakage.

Another object of the present invention is to make a melt spun TPU fiber which can be woven, knitted, or combined with polyester fiber to form a fabric and be capable of retaining good elastic properties after the fabric is dyed.

A further object of the present invention is to make a TPU fiber which can be melt spun and has good resistance to bleach, good dye pickup, and able to retain its color after washing.

DETAILED DESCRIPTION OF THE INVENTION

In the prior art method of making melt spun fibers from a polyether TPU polymer, it is customary to use an isocyanate terminated polyether intermediate having a number average molecular weight ($M_n$) of at least about 2000 Daltons to achieve good fiber properties.

Applicants have unexpectedly found that when using a polyether TPU polymer to make melt spun fiber, a blend of hydroxyl terminated intermediates having different number average molecular weights gives superior processing features for melt spinning fibers. It has been found that if the blend of hydroxyl terminated intermediates is such that the higher molecular weight intermediate blended with the lower molecular weight intermediate gives a weighted average molecular weight of at least 1200 Daltons. Preferably, from 1200 to 4000 Daltons, and more preferably from 1500 to 2500 Daltons, the TPU can be melt spun for extended periods of time without excessive pressure building up in the spin pack of the spinneret. Excessive pressure results in fiber breakage, thus requiring the melt spinning operation to be halted until the spin pack can be cleaned.

To produce the melt-spun fibers according to this invention, it is required to have a TPU made from a blend of at least two hydroxyl terminated intermediates and a crosslinking agent. The blend of intermediates has a first polyether intermediate as the major component and with a higher $M_n$ than the second intermediate. The second intermediate is selected from the group consisting of polyether, polyester, polycarbonate, polycaprolactone, and mixtures thereof, and the second intermediate has a lower $M_n$ than the first intermediate. Preferably, the second intermediate is also a polyether. For simplicity, the invention will be described herein in terms of polyether TPU having a blend of polyether intermediates. It should be recognized that the second intermediate can be other than polyether intermediates, but must be present in lower amounts and have a lower $M_n$ than the first polyether intermediate.

The polyether TPU used can be made by reacting a blend of at least two polyether hydroxyl terminated intermediates with a polyisocyanate and a chain extender.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly (propylene glycol) comprising propylene oxide reacted with propylene glycol, poly(tetramethyl glycol) comprising water reacted with tetrahydrofuran (PTMEG). Polytetramethylene ether glycol (PTMEG) is the preferred polyether intermediate. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn), as determined by assay of the terminal functional groups which is an average molecular weight greater than 700, such as from about 700 to about 10,000, desirably from about 1000 to about 5,000, and preferably from about 1000 to about 2500 Daltons.

This invention uses a blend of two or more polyether intermediates, with one polyether being a higher molecular weight than the other polyether. The lower molecular weight polyether will have a molecular weight Mn of from 700 to 1500 Daltons while the higher molecular weight polyether will have a $M_n$ from about 1500 to about 4000 Daltons, preferably from about 1800 to about 2500 Daltons. The blend should have a weighted average molecular weight of greater than 1200 Daltons, preferably greater than 1500 Daltons. For example, a 1000 gram sample of a blend of 70% by weight of a 2000 $M_n$ polyether and 30% by weight of a 1000 $M_n$ polyether would have a weighted average $M_n$ of 1538 Daltons of the two components in the 1000 grams mixture. The 2000 $M_n$ polyether component would have 0.35 moles (1000×0.7/2000). The 1000 $M_n$ polyether component would have 0.3 moles (1000×0.3/1000). The total moles would be 0.65 (0.35+0.3) moles in the 1000 gram sample and have a weighted average $M_n$ of (1000/0.65) or 1538 $M_n$.

The weight ratio in the blend of the first polyether hydroxyl terminated intermediate to the second hydroxyl terminated intermediate is from about 60:40 to about 90:10, and preferably from about 70:30 to 90:10. The amount of the first polyether intermediate is greater than the amount of the second intermediate.

The second necessary ingredient to make the TPU polymer of this invention is a polyisocyanate.

The polyisocyanates of the present invention generally have the formula $R(NCO)_n$ where n is generally from 2 to 4 with 2 being highly preferred inasmuch as the composition is a thermoplastic. Thus, polyisocyanates having a functionality of 3 or 4 are utilized in very small amounts, for example less than 5% and desirably less than 2% by weight based upon the total weight of all polyisocyanates, inasmuch as they cause crosslinking. R can be aromatic, cycloaliphatic, and aliphatic, or combinations thereof generally having a total of from 2 to about 20 carbon atoms. Examples of suitable aromatic diisocyanates include diphenyl methane-4,4'-diisocyanate (MDI), $H_{12}MDI$, m-xylylene diisocyanate (XDI), m-tetramethyl xylylene diisocyanate (TMXDI), phenylene-1,4-diisocyanate (PPDI), 1,5-naphthalene diisocyanate (NDI), and diphenylmethane-3,3'-dimethoxy-4,4'-diisocyanate (TODI). Examples of suitable aliphatic diisocyanates include isophorone diisocyanate (IPDI), 1,4-cyclohexyl diisocyanate (CHDI), hexamethylene diisocyanate (HDI), 1,6-diisocyanato-2,2,4,4-tetramethyl hexane (TMDI), 1,10-decane diisocyanate, and trans-dicyclohexylmethane diisocyanate (HMDI). A highly preferred diisocyanate is MDI containing less than about 3% by weight of ortho-para(2,4)isomer. A blend of two or more polyisocyanates may be used.

The third necessary ingredient to make the TPU polymer of this invention is the chain extender. Suitable chain extenders are lower aliphatic or short chain glycols having from about 2 to about 10 carbon atoms and include for instance ethylene glycol, diethylene glycol, propylene glycol, dipropylene glycol, tripropylene glycol, triethylene glycol, Cis-trans-isomers of cyclohexyl dimethylol, neopentyl glycol, 1,4-butanediol, 1,6-hexanediol, 1,3-butanediol, and 1,5-pentanediol. Aromatic glycols can also be used as the chain extender and are the preferred choice for high heat applications. Benzene glycol (HQEE) and xylenene glycols are suitable chain extenders for use in making the TPU of this invention. Xylenene glycol is a mixture of 1,4-di(hydroxymethyl)benzene and 1,2-di(hydroxymethyl)benzene. Benzene glycol is the preferred aromatic chain extender and specifically includes hydroquinone, i.e., bis(beta-hydroxyethyl)ether also known as 1,4-di(2-hydroxyethoxy)benzene; resorcinol, i.e., bis(beta-hydroxyethyl)ether also known as 1,3-di(2-hydroxyethyl) benzene; catechol, i.e., bis(beta-hydroxyethyl)ether also known as 1,2-di(2-hydroxyethoxy)benzene; and combinations thereof. For high heat resistant fibers, benzene glycol (HQEE) is the desired chain extender. Excellent results are obtained by using HQEE together with an isomer of HQEE.

It is preferred to use a co-chain extender together with the chain extender described above. The co-chain extender can be one of the materials described above as a chain extender. The co-chain extender is preferably selected from a material capable of reducing the crystallization rate of the TPU and eliminating high temperature melting peaks of the TPU. Branched compounds, such as dipropylene glycol and neopentyl glycol are excellent co-chain extenders. Also, for high heat applications, an isomer of HQEE, such as hydroxyl ethyl resorcinol (HER), is a very effective co-chain extender. When a co-chain extender is used, the level used is from about 2 to about 50 mole percent, preferably 10 to 30 mole percent, of the total moles of the chain extender and the co-chain extender.

A blend of two or more chain extenders can be used with a blend of two or more co-chain extenders, if desired. However, for simplicity, usually one chain extender is used with one co-chain extender.

The above three necessary ingredients (blend of different Mn polyether intermediates, polyisocyanate, and chain extender) are preferably reacted in the presence of a catalyst.

Generally, any conventional catalyst can be utilized to react the diisocyanate with the polyether intermediates or the chain extender and the same is well known to the art and to the literature. Examples of suitable catalysts include the various alkyl ethers or alkyl thiol ethers of bismuth or tin wherein the alkyl portion has from 1 to about 20 carbon atoms with specific examples including bismuth octoate, bismuth laurate, and the like. Preferred catalysts include the various tin catalysts such as stannous octoate, dibutyltin dioctoate, dibutyltin dilaurate, and the like. The amount of such catalyst is generally small such as from about 20 to about 200 parts per million based upon the total weight of the polyurethane forming monomers.

The polyether TPU polymers of this invention can be made by any of the conventional polymerization methods well known in the art and literature.

Thermoplastic polyurethanes of the present invention are preferably made via a "one shot" process wherein all the components are added together simultaneously or substantially simultaneously to a heated extruder and reacted to form the polyurethane. The equivalent ratio of the diisocyanate to the total equivalents of the hydroxyl terminated polyether intermediates and the diol chain extender is generally from about 0.95 to about 1.10, desirably from about 0.97 to about 1.03, and preferably from about 0.97 to about 1.00. It is preferred that the equivalent ratio is less than 1.0 such that the TPU has terminal hydroxyl groups to enhance the reaction with the crosslinking agent during the fiber spinning process. The Shore A hardness of the TPU formed should be from 65 A to 95 A, and preferably from about 75 A to about 85 A, to achieve the most desirable melt spun fibers. Reaction temperatures utilizing urethane catalyst are generally from about 175° C. to about 245° C. and preferably from about 180° C. to about 220° C. The molecular weight (Mw) of the thermoplastic polyurethane is generally from about 25,000 to about 300,000 and desirably from about 50,000 to about 200,000 and preferably about 75,000 to about 150,000 as measured by GPC relative to polystyrene standards. The preferred $M_w$ is lower than the prior art recommends for the TPU fiber, but the lower $M_w$ allows for better mixing of the TPU with the crosslinking agent to give excellent fiber spinning.

The thermoplastic polyurethanes can also be prepared utilizing a pre-polymer process. In the pre-polymer route, the hydroxyl terminated polyether intermediates are reacted with generally an equivalent excess of one or more polyisocyanates to form a pre-polymer solution having free or unreacted polyisocyanate therein. Reaction is generally carried out at temperatures of from about 80° C. to about 220° C. and preferably from about 150° C. to about 200° C. in the presence of a suitable urethane catalyst. Subsequently, a selective type of chain extender as noted above is added in an equivalent amount generally equal to the isocyanate end groups as well as to any free or unreacted diisocyanate compounds. The overall equivalent ratio of the total diisocyanate to the total equivalent of the hydroxyl terminated polyethers and the chain extender is thus from about 0.95 to about 1.10, desirably from about 0.98 to about 1.05 and preferably from about 0.99 to about 1.03. The equivalent ratio of the hydroxyl terminated polyethers to the chain extender is adjusted to give 65 A to 95 A, preferably 75 A to 85 A shore hardness. The chain extension reaction temperature is generally from about 180° C. to about 250° C. with from about 200° C. to about 240° C. being preferred. Typically, the pre-polymer route can be carried out in any conventional device with an extruder being preferred. Thus, the polyether intermediates are reacted with an equivalent excess of a diisocyanate in a first portion of the extruder to form a pre-polymer solution and subsequently the chain extender is added at a downstream portion and reacted with the pre-polymer solution. Any conventional extruder can be utilized, with extruders equipped with barrier screws having a length to diameter ratio of at least 20 and preferably at least 25. The prepolymer method can reduce high temperature melting peaks of the TPU and eliminate the need for a co-chain extender as described in the one-shot process above.

Useful additives can be utilized in suitable amounts and include opacifying pigments, colorants, mineral fillers, stabilizers, lubricants, UV absorbers, processing aids, and other additives as desired. Useful opacifying pigments include titanium dioxide, zinc oxide, and titanate yellow, while useful tinting pigments include carbon black, yellow oxides, brown oxides, raw and burnt sienna or umber, chromium oxide green, cadmium pigments, chromium pigments, and other mixed metal oxide and organic pigments. Useful fillers include diatomaceous earth (superfloss) clay, silica, talc, mica, wallostonite, barium sulfate, and calcium carbonate. If desired, useful stabilizers such as antioxidants can be used and include phenolic antioxidants, while useful photostabilizers include organic phosphates, and organotin thiolates (mercaptides). Useful lubricants include metal stearates, paraffin oils and amide waxes. Useful UV absorbers include 2-(2'-hydroxyphenol)benzotriazoles and 2-hydroxybenzophenones.

Plasticizer additives can also be utilized advantageously to reduce hardness without affecting properties.

During the melt spinning process, the TPU polymer described above is lightly crosslinked with a crosslinking agent. The crosslinking agent is a pre-polymer of a hydroxyl terminated intermediate that is a polyether, polyester, polycarbonate, polycaprolactone, or mixture thereof reacted with a polyisocyanate. A polyester or polyether is the preferred hydroxyl terminated intermediate to make the crosslinking agent. The crosslinking agent, pre-polymer, will have an isocyanate functionality of greater than about 1.0, preferably from about 1.0 to about 3.0, and more preferably from about 1.8 to about 2.2. It is particularly preferred if both ends of hydroxyl terminated intermediate is capped with an isocyanate, thus having an isocyanate functionality of 2.0.

The polyisocyanate used to make the crosslinking agent are the same as described above in making the TPU polymer. A diisocyanate, such as MDI, is the preferred diisocyanate.

The hydroxyl terminated polyester intermediate used to make the crosslinking agent is generally a linear or branched polyester having a number average molecular weight (Mn) of from about 500 to about 10,000, desirably from about 700 to about 5,000, and preferably from about 700 to about 4,000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, neopentyl glycol, dipropylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. 1,4-butanediol and mixtures with neopentyl glycol are the preferred glycol.

U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6,2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3,1,4-endomethylene-2-hydroxy-5-hydroxymethyl cyclohexane, and polyalkylene glycols. The diols used in the reaction may be a single diol or a mixture of diols depending on the properties desired in the finished product.

Polycarbonate intermediates which are hydroxyl terminated are generally those known to the art and in the literature. Suitable carbonates are selected from alkylene carbonates composed of a 5 to 7 membered ring having the following general formula:

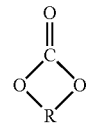

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10,000 but in a preferred embodiment, it will be in the range of 500 to 2500.

If a polyether crosslinking agent is desired, it is made from a hydroxyl terminated polyether intermediate as described above for making the TPU polymer and is reacted with a polyisocyanate to form a pre-polymer.

The crosslinking agents have a number average molecular weight (Mn) of from about 1,000 to about 10,000, preferably from about 1,200 to about 4,000 and more preferably from about 1,500 to about 2,800. Crosslinking agents with a $M_n$ above about 1500 give better set properties.

The weight percent of crosslinking agent used with the TPU polymer is from about 5.0% to about 20%, preferably about 8.0% to about 15%, and more preferably from about 10% to about 13% The percentage of crosslinking agent used is weight percent based upon the total weight of TPU polymer and crosslinking agent.

The melt spinning process to make TPU fibers involves feeding a preformed TPU polymer, usually which is melted in the extruder and the crosslinking agent is added continuously downstream near the point where the TPU melt exits the extruder or after the TPU melt exits the extruder. The crosslinking agent can be added to the extruder before the melt exits the extruder or after the melt exits the extruder. If added after the melt exits the extruder, the crosslinking agent needs to be mixed with the TPU melt using static or dynamic mixers to assure proper mixing of the crosslinking agent into the TPU polymer melt. After exiting the extruder and mixer, the melted TPU polymer with crosslinking agent flows into a manifold. The manifold divides the melt stream into different streams, where each stream is fed to a plurality of spinnerets. Usually, there is a melt pump for each different stream flowing from the manifold, with each melt pump feeding several spinnerets. The spinneret will have a small hole through which the melt is forced and exits the spinneret in the form of a fiber. The size of the hole in the spinneret will depend on the desired size (denier) of the fiber. The fiber is drawn or stretched as it leaves the spinneret and is cooled before winding onto bobbins. The fibers are stretched by winding the bobbins at a higher speed than that of fiber exiting the spinneret. For the melt spun TPU fibers, the bobbins are usually wound at a rate of 4 to 6 times the speed of the fiber exiting the spinneret, but can be wound slower or faster depending on the particular equipment. Typical bobbin winding speeds can vary from 100 to 3000 meters per minute, but more typical speeds are 300 to 1200 meters per minute for TPU melt spun fibers. Finish oils, such as silicone oils, are usually added to the surface of the fibers after cooling and just prior to being wound into bobbins.

An important aspect of the melt spinning process is the mixing of the TPU polymer melt with the crosslinking agent. Proper uniform mixing is important to achieve uniform fiber properties and to achieve long run times without experiencing fiber breakage. The mixing of the TPU melt and crosslinking agent should be a method which achieves plug-flow, i.e., first in first out. The proper mixing can be achieved with a dynamic mixer or a static mixer. Static mixers are more difficult to clean; therefore, a dynamic mixer is preferred. A dynamic mixer which has a feed screw and mixing pins is the preferred mixer. U.S. Pat. No. 6,709,147, which is incorporated herein by reference, describes such a mixer and has mixing pins which can rotate. The mixing pins can also be in a fixed position, such as attached to the barrel of the mixer and extending toward the centerline of the feed screw. The mixing feed screw can be attached by threads to the end of the extruder screw and the housing of the mixer can be bolted to the extruder machine. The feed screw of the dynamic mixer should be a design which moves the polymer melt in a progressive manner with very little back mixing to achieve plug-flow of the melt. The L/D of the mixing screw should be from over 3 to less than 30, preferably from about 7 to about 20, and more preferably from about 10 to about 12.

The temperature in the mixing zone where the TPU polymer melt is mixed with the crosslinking agent is from about 200° C. to about 240° C., preferably from about 210° C. to about 225° C. These temperatures are necessary to get the reaction while not degrading the polymer.

The TPU formed is reacted with the crosslinking agent during the fiber spinning process to give a molecular weight (Mw) of the TPU in fiber form of from about 200,000 to about 800,000, preferably from about 250,000 to about 500,000, more preferably from about 300,000 to about 450,000. The reaction in the fiber spinning process between the TPU and the crosslinking agent at the point where the TPU exits the spinneret should be above 20%, preferably from about 30% to about 60%, and more preferably from about 40% to about 50%. Typical prior art TPU melt spinning reaction between the TPU polymer and the crosslinking agent is less than 20% and usually about 10-15% reaction. The reaction is determined by the disappearance of the NCO groups. The higher % reaction of this invention improves melt strength thus allowing a higher spinning temperature which improves the spinnability of the TPU. The fibers are normally aged in an oven on the bobbins to fully complete the reactiton and thus all of the NCO groups disappear in the fiber as used in garments.

The spinning temperature (the temperature of the polymer melt in the spinneret) should be higher than the melting point of the polymer, and preferably from about 10° C. to about 20° C. above the melting point of the polymer. The higher the spinning temperature one can use, the better the spinning. However, if the spinning temperature is too high, the polymer can degrade. Therefore, from about 10° C. to about 20° C. above the melting point of the TPU polymer, is the optimum for achieving a balance of good spinning without degradation of the polymer. If the spinning temperature is too low, polymer can solidify in the spinneret and cause fiber breakage. The spinning temperature for the fibers produced by this invention is greater than 200° C. and preferably from about 205° C. to about 220° C.

An important aspect of making melt spun TPU fibers is the time one can run the process continuously without stopping. The necessity to stop the process is usually a result of fiber breaking. Fiber breaking occurs when the pressure at the spinneret increases to an unacceptable level. When the pressure reaches about 140 to 200 Kg force per square cm., fiber breakage will usually occur. Pressure buildup can occur for several reasons such as improper mixing leading to formation of products due to self reaction of the crosslinking agent causing partial blockage of the small exit hole in the spinneret for the fiber. The present invention allows for much longer run times before exceeding harmful pressure build-up resulting in fiber breakage.

Melt spun TPU fibers can be made in a variety of denier. Denier is a term in the art designating the fiber size. Denier is the weight in grams of 9000 meters of fiber length. Typical melt spun TPU fibers are made in a denier size less than 240, more typical from 10 to less than 240 denier size, with 20 and 40 denier being a popular size.

The elastic TPU fibers are used to combine by knitting or weaving with other fibers such as natural and synthetic fibers to make various articles of clothing. The TPU fibers can be dyed various colors.

The melt spun elastic TPU fibers of this invention are normally combined by knitting or weaving with other fibers, such as cotton, nylon or polyester to make various end use articles, including clothing garments. The weight % of the melt spun elastic fibers in the end use application can vary depending on the desired elasticity. For example, woven fabrics have from 1-8 wt. %, underwear from 2-5 wt. %, bathing suits and sportswear from 8-30 wt. %, foundation garments from 10-45 wt. %, and medical hose from 35-60 wt. % of the elastic melt spun fibers with the remaining amount being another type of non-elastic fiber.

Prior art melt spun TPU fibers are not normally used in combination with polyester fibers because of the high temperature, required to dye polyester. Polyester fibers use dispersive dyes and are normally dyed at 120° C. to 135° C. and typically about 130° C. for 60 minutes. Prior art melt spun TPU fibers cannot withstand this type of temperature for 60 minutes without losing their physical properties such as tensile (tenacity) and percent set.

The high heat resistance of the melt spun TPU fibers of this invention can withstand the dyeing operation for polyester fibers, while retaining sufficient physical properties to remain elastic.

Another feature of the high heat resistant melt spun TPU fibers of this invention is their ability to pickup dispersive dyes. The dye pickup of the fibers is greater than 1.6% by weight and preferably greater than 2.0% by weight. The fibers of this invention also have good dye retention after washing. The dye pickup and dye retention is about double the values for Lycra® T162C (dry spun TPU made by E.I. DuPont).

A further benefit of the fibers of this invention is their resistance to bleach. Degradation caused by chlorine in the bleach is a major concern for dry spun TPU, such as Lycra®. The bleach will destroy the fiber power and tenacity. This is a major problem for swim suits, as swimming pools contain chlorine. Although Lycra® retains its % set very well when exposed to bleach, the tenacity and power degrade to great extent, thus giving the garment a shorter than desirable life span. This invention provides an elastic fiber based on polyurethane which retains greater than 50% of its tenacity and power when exposed for 7 hours in an 8% chlorine bleach solution at 70° C. In the most preferred embodiment, the fiber retains greater than 60% of its original tenacity and 80% of its power after exposure to an 8% chlorine bleach solution for 7 hours at 70° C.

The invention will be better understood by reference to the following examples.

EXAMPLES

Example 1 is a comparative example of a prior art TPU showing the making of a TPU with a single polyether intermediate and an aliphatic chain extender. Example 2 is also a comparative example showing the making of a TPU with a single polyether intermediate and an aromatic chain extender together with a co-chain extender. Example 3 is a TPU of this invention having mixed polyether intermediates and an aromatic chain extender. Example 4 is the most preferred TPU of this invention which is a TPU having mixed polyether intermediates and an aromatic chain extender together with a co-chain extender. Example 5 is similar to Example 4, except Example 5 has a higher amount of the lower molecular weight polyether intermediate. Example 6 is a comparative example of a prior art TPU showing a polyester intermediate and an aliphatic chain extender. Example 7 shows fibers being melt spun from each of the TPUs of Examples 1-6 where 10 wt. % of crosslinking agent was added to the TPU melt. Example 8 shows the dyeing of fibers and dye pickup, color fastness of the dye after washing, and bleach resistance of the fibers of this invention compared to Lycra (dry spun) fibers. Example 9 shows that the fiber spinning time is greatly improved when the TPU has mixed polyether intermediates.

Example 1 (Comparative)

A preheated to 120° C. mixture of: 68.5 parts by weight of polyether intermediate (PTMEG) of molecular weight ($M_n$) 2000, 5.82 parts by weight of 1,-4-butanediol (BDO) chain extender, 0.3 parts by weight of antioxidant and 0.3 parts by weight of UV stabilizer, was reacted at a temperature of 200° C. with 25.07 parts by weight of MDI and 0.4 parts by weight of lubricant in a 40 mm co-rotating twin screw extruder in the presence of 50 ppm stannous octoate acting as a catalyst. The resulting polymer was underwater pelletized and collected in a silo heated at 105° C. to dry the product. The resultant TPU had a molecular weight ($M_n$) of 300,000 Dalton and was used in Example 7 to make melt spun fibers.

Example 2 (Comparative)

A preheated to 120° C. mixture of: 76.0761 parts by weight of polyether intermediate (PTMEG) of molecular weight ($M_n$) 2000, 5.116 parts by weight of benzene glycol (HQEE) chain extender, 1.2435 parts by weight of hydroxyl ethyl resorcinol (HER) co-chain extender, 0.3 parts by weight of antioxidant and 0.3 parts by weight of UV stabilizer, was reacted at a temperature of 200° C. with 17. 5440 parts by weight of MDI and 0.4 parts by weight of lubricant in a 40 mm co-rotating twin screw extruder in the presence of 50 ppm stannous octoate acting as a catalyst. The resulting polymer was underwater pelletized and collected in a silo heated at 105° C. to dry the product. The resultant TPU had a molecular weight ($M_n$) of 150,000 Dalton and was used in Example 7 to make melt spun fibers.

Example 3

A preheated to 120° C. mixture of: 54.8968 parts by weight of polyether intermediate (PTMEG) of molecular weight ($M_n$) 2000, 23.5272 parts by weight of of polyether intermediate (PTMEG) of molecular weight ($M_n$) 1000, 8.2149 parts by weight of benzene glycol (HQEE) chain extender, 0.3 parts by weight of antioxidant and 0.3 parts by weight of UV stabilizer, was reacted at a temperature of 200° C. with 21.5760 parts by weight of MDI and 0.4 parts by weight of lubricant in a 40 mm co-rotating twin screw extruder in the presence of 50 ppm stannous octoate acting as a catalyst. The resulting polymer was underwater pelletized and collected in a silo heated at 105° C. to dry the product. The resultant TPU had a molecular weight ($M_n$) of 150,000 Dalton and was used in Example 7 to make melt spun fibers.

Example 4

A preheated to 120° C. mixture of: 60.1952 parts by weight of polyether intermediate (PTMEG) of molecular weight ($M_n$) 2000, 10.6227 parts by weight of polyether intermediate (PTMEG) of molecular weight ($M_n$) 1000, 6.6878 parts by weight of benzene glycol (HQEE) chain extender, 1.6719 parts by weight of hydroxyl ethyl resorcinol (HER) co-chain extender, 0.3 parts by weight of antioxidant and 0.3 parts by weight of UV stabilizer, was reacted at a temperature of 200° C. with 20.82 parts by weight of MDI and 0.4 parts by weight of lubricant in a 40 mm co-rotating twin screw extruder in the presence of 50 ppm stannous octoate acting as a catalyst. The resulting polymer was underwater pelletized and collected in a silo heated at 105° C. to dry the product. The resultant TPU had a molecular weight ($M_n$) of 150,000 Dalton and was used in Example 7 to make melt spun fibers.

Example 5

A preheated to 120° C. mixture of: 59.8450 parts by weight of polyether intermediate (PTMEG) of molecular weight ($M_n$) 2000, 14.9612 parts by weight of polyether intermediate (PTMEG) of molecular weight ($M_n$) 1000, 5.003 parts by weight of benzene glycol (HQEE) chain extender, 1.2508 parts by weight of hydroxyl ethyl resorcinol (HER) co-chain extender, 0.3 parts by weight of antioxidant and 0.3 parts by weight of UV stabilizer, was reacted at a temperature of 200° C. with 18.94 parts by weight of MDI and 0.4 parts by weight of lubricant in a 40 mm co-rotating twin screw extruder in the presence of 50 ppm stannous octoate acting as a catalyst. The resulting polymer was underwater pelletized and collected in a silo heated at 105° C. to dry the product. The resultant TPU had a molecular weight ($M_n$) of 150,000 Dalton and was used in Example 7 to make melt spun fibers.

Example 6 (Comparative)

A preheated to 120° C. mixture of: 75.5200 parts by weight of polyester intermediate (PTMAG) of molecular weight ($M_n$) 2500, 4.48 parts by weight of 1,4-butenadiol (BDO) chain extender, 0.3 parts by weight of antioxidant and 0.3 parts by weight of UV stabilizer, was reacted at a temperature of 200° C. with 20 parts by weight of MDI and 0.4 parts by weight of lubricant in a 40 mm co-rotating twin screw extruder in the presence of 50 ppm stannous octoate acting as a catalyst. The resulting polymer was underwater pelletized and collected in a silo heated at 105° C. to dry the product. The resultant TPU had a molecular weight ($M_n$) of 300,000 Dalton and was used in Example 7 to make melt spun fibers.

Example 7

This Example is presented to show the TPU polymers of Examples 1-6 made into 40 denier fibers by melt spinning process. To each of the TPU polymers, 10 wt. % of crosslinking agent per total weight of the TPU polymer and crosslinking agent was used to lightly crosslink the TPU fibers. The TPU polymers of Examples 1, 3, 4 and 6 used a polyester crosslinking agent (Hyperlast® 5255), while Examples 2 and 5 used a polyether crosslinking agent (Hyperlast® 5200). Both the polyester and polyether crosslinking agents have a $M_n$ of 2500.

The TPU polymer of Examples 1-6 were pre-dried in a vacuum batch dryer at 80° C. for 12 hours. After drying, the TPU polymer was melted in a 1.25 inch single screw extruder with an L/D of 24. The back pressure at the extruder outlet was kept constant with a loop control. The extruder had four heating zones that were maintained between 180° C. and 219° C. On exiting the extruder, the TPU polymer melt was mixed with 10 wt. % of a prepolymer crosslinking agent (polyester type for the TPU of Examples 1, 3, 4 and 6 and polyether type for Examples 2 and 5). The crosslinking agent was mixed with the TPU polymer melt in a dynamic mixer and then pumped through a manifold to 32 spinnerets. Each spinneret had an orifice size of 0.5 mm. The polymer stream exiting the spinneret was cooled by air, a silicon finish oil applied, and the fiber formed was wound into a bobbin at a winding speed of 480 meters per minute. The fiber on the bobbins were heat aged at 80° C. for 24 hours before testing the physical properties of the fibers. The results are shown in Table 1 below.

The 40 denier TPU melt spun fibers produced by the polymers of Examples 1-6 were tested for their elastic properties. Fiber tensile (tenacity) properties were measured using Table Top Model 5564 Instron equipped with tension/compression load cell (10 N maximum static load capacity) and pneumatic yarn grips to prevent fiber slippage and "at grip" breaks.

The test procedure employed was that developed by DuPont for elastic yarns used in garments requiring either good recovery from stretch or good holding power. This test subjects fibers to a series of 5 cycles. In each cycle, the fiber is alternately stretched to 300% elongation, and relaxed using a constant extension rate (between the original gage length and 300% elongation). The % set is measured after completion of the $5^{th}$ cycle. Then, the fiber specimen is taken through a $6^{th}$ cycle and stretched to breaking. The instrument records the load at each extension, the highest load before breaking, and the breaking load in units of grams force per denier as well as the breaking elongation and elongation at the maximum load.

The test conditions were at 23° C.±2° C.; 50%±5% humidity. Fiber length of the test specimens were 50.0 mm. Three specimens were tested and the results averaged. The results are shown in Table 1.

TABLE 1

| Ex. 1 | Ex. 2 | Ex. 3 | Ex. 4 | Ex. 5 | Ex. 6 | Property |
|---|---|---|---|---|---|---|
|  |  |  |  |  |  | $1^{st}$ Load Pull (%) |
| 0.108 | 0.106 | 0.137 | 0.211 | 0.121 | 0.098 | 100 |
| 0.157 | 0.165 | 0.186 | 0.318 | 0.198 | 0.148 | 150 |
| 0.224 | 0.240 | 0.262 | 0.452 | 0.296 | 0.200 | 200 |
| 0.411 | 0.389 | 0.524 | 0.872 | 0.533 | 0.348 | 300 |
|  |  |  |  |  |  | $1^{st}$ Unload Pull (%) |
| 0.033 | 0.034 | 0.034 | 0.039 | 0.033 | 0.026 | 200 |
| 0.023 | 0.025 | 0.022 | 0.025 | 0.021 | 0.019 | 150 |
| 0.018 | 0.020 | 0.017 | 0.019 | 0.017 | 0.015 | 100 |
|  |  |  |  |  |  | $5^{th}$ Load Pull (%) |
| 0.022 | 0.027 | 0.022 | 0.027 | 0.022 | 0.022 | 100 |
| 0.033 | 0.039 | 0.036 | 0.041 | 0.033 | 0.028 | 150 |
| 0.048 | 0.051 | 0.055 | 0.063 | 0.048 | 0.039 | 200 |
| 0.242 | 0.254 | 0.298 | 0.439 | 0.292 | 0.200 | 300 |
|  |  |  |  |  |  | $5^{th}$ Unload Pull (%) |
| 0.031 | 0.030 | 0.034 | 0.037 | 0.031 | 0.024 | 200 |
| 0.022 | 0.024 | 0.023 | 0.025 | 0.020 | 0.018 | 150 |
| 0.017 | 0.021 | 0.015 | 0.019 | 0.016 | 0.015 | 100 |
| 25.344 | 20.774 | 37.843 | 25.32 | 28.11 | 19.51 | % Set After $5^{th}$ Pull |
| 0.667 | 1.161 | 1.060 | 1.734 | 1.483 | 0.752 | Break Load gm/denier |
| 529 | 639 | 514. | 481 | 508 | 502 | Break Elongation (%) |

The data in Table 1 show that the mixture of polyether intermediates (70% 2000 $M_n$ PTMEG and 30% 1000 $M_n$ PTMEG) with an aromatic chain extender (HQEE) gives higher percent set than a TPU fiber made with a higher ratio of 2000 $M_n$ (85% 2000 $M_n$ PTMEG and 15% 1000 $M_n$ PTMEG) and two chain extenders (80% HQEE and 20% HER). The fibers from the TPU of Example 3 are acceptable, but not as preferred as the fibers from the TPU of Example 4. The power ($5^{th}$ load, 300%) is also greater for the Examples 3, 4 and 5 TPU (this invention) than the TPUs of Examples 1, 2 and 6.

Example 8

This Example is presented to show the physical properties of melt spun fibers after dyeing at 130° C. for 60 minutes (dyeing conditions for polyester fibers) and to show dye pickup, color fastness (after washing) and bleach resistance. The dye used was a dark blue disperse dye Terasile® W from Ciba. A 2 wt. % dye based on fabric weight in a dye solution was used. 1000 g of the dye solution contained 996 g de-ionized water, 2 g of diffusion accelerator, 2 g of buffer solution, and 0.005 g of scavenger of metal impurities. To 1000 g of this dye solution, 0.2 g of dark blue dye (Terasile® W) was added. The selection of blue dye was directed by the fact that dark shades are known to cause more problems of non-uniformity in dye coverage than lighter shades. The scouring solution used was 6 g $Na_2CO_3$, 2 g NaOH (50%), and 992 g de-ionized water. The ingredients were mixed together and heated to 50° C. until fully dissolved. The reduction scour solution used was 100 g of sodium hydrosulphite (10% solution) in 900 g of de-ionized water. The ingredients were mixed well at 50° C. until full dissolution to form the reduction scour solution. The reductive clear solution used 40 g of the above reductive scour solution with 960 g of the above scouring solution.

The fibers were then scoured, dyed, and the reductive clear solution was applied using a Rotodyer HT® dyeing machine from SDL America Inc. The machine was composed of a single bath (filled with polyethylene glycol 300 heating fluid), and equipped with a fully programmable bath temperature control. Fiber samples weighing about 1 g were placed inside stainless steel tubes pre-filled with the appropriate solution. The fibers were first scoured with the above scouring solution at 70° C. for 25 minutes to remove the finish oil and any other foreign matter on the fibers. The fibers were then rinsed with warm tap water. The fibers were dyed at 130° C. for 60 minutes. After dyeing, the dye solution was replaced by a reductive clear solution for 20 minutes at 70° C. to remove excess dye. Fiber samples were rinsed with warm tap water until there was no further dye bleeding and neutralized with dilute acetic acid.

Fibers were melt spun as in Example 7 using TPU polymers from Examples 1, 3, 4 and 6 and compared with DuPont Lycra T162C (dry spun fibers), for mechanical properties before and after dyeing at 130° C. from 60 minutes. The results are shown below in Table 2.

The data in Table 2 show that prior art fibers made from the TPU of Example 6 cannot withstand the dyeing cycle of polyester fiber (130° C. for 60 minutes). After dyeing, the fiber was fused and could not be tested. The TPU of Example 6 (prior art) was made with a polyester intermediate and an aliphatic chain extender (1,4 butanediol). The heat resistance was too low to be acceptable to be combined with polyester fibers to make an elastic fabric. Also, the fibers from the TPU of Example 1 made with a 2000 $M_n$ polyether intermediate (PTMEG) and an aliphatic chain extender (1,4 butanediol) did not have as good power after dyeing as did the fibers made from the TPUs of Examples 3 and 4. The % set after dyeing was also higher for the TPU of Example 1 than for Examples 3 and 4. The power loss after dyeing for the Lycra fiber was also much greater than for the TPU fibers of Examples 3 and 4 (this invention).

The wt. % dye pickup and dye retained after washing (color fastness) was also measured for fibers made according to Example 7 from the TPU polymer of Example 4 and compared to Lycra® T162C (dry spun) from DuPont.

The wt. % dye pickup was determined by weighing the fibers before and after dyeing and the amount of dye pickup was calculated. The color fastness was determined by washing in a wash solution of water with 0.4 wt. % Liquid Tide® detergent. The washing was done using a Rotodyer HT dyeing machine from SDL America Inc. at 50° C. for 60 minutes. The fiber to detergent ratio was 1:45. According to AATCC Test Method 61-1996, such laundering if done in a 0.15% detergent solution, corresponds to about 5 home machine laundering cycles. Since this Example used a 0.4 wt. % detergent solution, it would be equivalent to much greater than 5 home washing cycles.

The color fastness was determined by light absorption. 1 g dyed and washed fiber was immersed in 10 ml of methanol solution for 30 minutes. A 2 ml solution was removed and diluted with 10 ml methanol and its absorbance spectrum measured between 400 nm and 700 nm. The absorption of all extracts, that peaked at 605 nm was measured and the total absorbance/g sample/g methanol was calculated. The results are shown in Table 3 below.

TABLE 2

| TPU Polymer | Denier | Tenacity g F/d | $5^{th}$ Cycle 300% Power g F/d | Max. Elongation, % | $5^{th}$ Cycle Set, % |
|---|---|---|---|---|---|
| Ex. 1 | 20 | Before*: 0.99 | Before: 0.352 | Before: 382 | Before: 22 |
|  |  | After**: 1.56 | After: 0.139 | After: 532 | After: 36 |
| Ex. 3 | 20 | Before: 1.53 | Before: 0.346 | Before: 533 | Before: 22 |
|  |  | After: 1.42 | After: 0.221 | After: 678 | After: 33 |
| Ex. 4 | 40 | Before: 1.67 | Before: 0.393 | Before: 515 | Before: 25 |
|  |  | After: 1.17 | After: 0.269 | After: 491 | After: 30 |
| Ex. 6 | 20 | Before: 1.630 | Before: 0.212 | Before: 520 | Before: 16 |
|  | After: ← Fiber Melted and Fused → | | | | |
| Lycra ® T162C | 40 | Before: 1.55 | Before: 0.400 | Before: 455 | Before: 31 |
|  |  | After: 1.44 | After: 0.192 | After: 638 | After: 17 |

*Before Dyeing
**After Dyeing

TABLE 3

| TPU Polymer | Denier | WT % Dye Pickup | Absorbance Intensity At 605 nm (Dye Retained in Fibers) After Washing |
|---|---|---|---|
| Ex. 4 | 40 | 2.5 | 410 |
| Lycra ® T162C | 40 | 1.3 | 279 |

As can be seen from the data in Table 3, the fibers of this invention have much greater dye pickup (2.5%) compared to Lycra (1.3%) and also have much greater color fastness after washing than Lycra.

The 40 denier fibers made according to Example 7 using the polymer of Example 4 was also evaluated for bleach resistance and compared to Lycra® T162C fibers (dry spun). The bleach resistant test used an 8% Clorox® bleach solution at 70° C. The fibers were placed in the 70° C., 8% bleach solution and their mechanical properties were measured after exposure for 0, 3, and 7 hours. The results are shown in Table 4 below.

TABLE 4

| TPU Polymer | Hours in Bleach | Tenacity gF/d | 5$^{th}$ Cycle 300% Power, gF/d | Max. Elongation % | 5$^{th}$ Cycle Set, % |
|---|---|---|---|---|---|
| Ex. 4 | 0 | 1.76 | 0.401 | 470 | 24 |
|  | 3 | 1.02 | 0.355 | 383 | 23 |
|  | 7 | 1.06 | 0.337 | 395 | 32 |
| Lycra ® T162C | 0 | 1.02 | 0.338 | 423 | 23 |
|  | 3 | 0.52 | 0.235 | 371 | 23 |
|  | 7 | 0.18 | 0.104 | 348 | 31 |

From the results shown in Table 4, it can be seen that the melt spun fibers made from the TPU polymer of Example 4 has much superior bleach resistance than the Lycra fibers. After 7 hours exposure to the 8% chlorine bleach solution at 70° C., the fibers with the TPU polymer of Example 4 lost only 0.064 gF/d of power as compared to a loss of 0.234 gF/d for the Lycra sample. This shows about a factor of 4 improvement for the fibers of this invention. The improvement in tenacity after exposure to chlorine bleach is also quite evident when comparing the fiber of this invention to Lycra.

Example 9

This Example is presented to show that the fiber run time is greatly increased by using a mixture of polyether intermediates in the TPU. The TPUs of Example 2 and 5 were compared for running time. 40 denier fibers were produced as in Example 7 and the preassure at the spinneret was measured during the run.

Fort the TPU with a single polyether intermediate (2000 $M_n$ PTMEG) (Example 2 TPU), the spin pack pressure force at the start of the run was about 30 Kg/cm². After 21 hours of continuously running the pressure had increased to about 45 Kg/cm² and thereafter proceeded to rise rapidly reaching 100 Kg/cm² after 22 hours. After 30 hours, the preassure reached 140 Kg/cm² and several of the fibers started to break. The run was stopped after 30 hours because of fiber breakage.

For the TPU with a mixture of polyether intermediates (80% 2000 $M_n$ PTMEG and 20% 1000 $M_n$ PTMEG) (Example 5 TPU), the spin pack pressure force at the start of the run was about 80 Kg/cm². After 50 hours, the spin pack pressure increased to 100 Kg/cm². There was no fiber breakage and the run was stopped after 50 hours because the starting materials was all consumed.

In comparing fibers made from the TPU of Examples 2 and 5, it can be seen that the difference in melt spinability in quite surprising when using a TPU made from a blend of polyether intermediates. It is believed that since the TPU of Example 5 had very slight pressure buildup, it could likely have run for a much longer time, if there had been sufficient material available to continue the run. Although the fibers made from a TPU with a single polyether intermediate have good properties, it is necessary to have a blend of intermediates to achieve long run times in the melt spinning process. Long run times are essential for commercial operations.

The data from the Examples also show that it is necessary to have an aromatic chain extender to achieve high heat properties which allow the melt spun fibers to be combined with polyester fibers. The data also show that a co-chain extender is desirable to achieve good spinning operations. It is believed that the co-chain extender reduces the high melting peaks of the TPU, thus allowing complete melting in the spinning process. The co-chain extender would not be as important if the TPU polymer was made by the prepolymer route.

From the above data, it can be seen that the melt spun fibers have excellent elastic properties.

While in accordance with the Patent Statutes, the best mode and preferred embodiment has been set forth, the scope of the invention is not limited thereto, but rather by the scope of the attached claims.

What is claimed is:

1. A process for producing melt spun thermoplastic polyurethane fibers comprising:
    (a) melting in an extruder a TPU polymer made by the one shot process and having a shore hardness of from 65 A to 95 A and formed by the reaction of:
        (i) a first hydroxyl terminated polyether intermediate having a number average molecular weight of from 1500 to 4000 Daltons;
        (ii) a second hydroxyl terminated polyether intermediate having a number average molecular weight of from 700 to 1500 Daltons;
        (iii) at least one aromatic hydroxyl terminated chain extender; and
        (iv) at least one polyisocyanate;
    wherein said first hydroxyl terminated polyether intermediate is present in larger amount than said second hydroxyl terminated polyether intermediate, wherein the weight ratio of the first polyether hydroxyl terminated intermediate to the second hydroxyl terminated intermediate is from about 60:40 to about 90:10 and wherein said first hydroxyl terminated polyether intermediate has a higher number average molecular weight than said second hydroxyl terminated polyether intermediate, and wherein the weighted average number average molecular weight of said first and said second hydroxyl terminated intermediate is at least 1200 Daltons;
    (b) adding to said melted thermoplastic polyurethane polymer at least one crosslinking agent made from reacting (i) a hydroxyl terminated polyol selected from the group consisting of polyether, polyester, polycaprolactone, polycarbonate, and mixtures thereof, and (ii) at least one polyisocyanate, wherein said crosslinking agent is added to said melted thermoplastic polyurethane polymer by the method selected from the group consisting of adding said crosslinking agent in said extruder and adding said crosslinking agent after said polymer exits said extruder;

(c) feeding said melted thermoplastic polyurethane polymer mixed with said crosslinking agent to at least one spinneret;

(d) passing said melted polymer containing said crosslinking agent through said spinneret to produce melt spun fibers;

(e) cooling said fibers; and (f) winding said fibers onto bobbins.

2. The process of claim 1 wherein said crosslinking agent is added to said melted thermoplastic polyurethane polymer after said polymer exits said extruder and wherein said crosslinking agent and said polymer are mixed with a dynamic mixer.

3. The process of claim 1 wherein said crosslinking agent is added to said melted thermoplastic polyurethane polymer after said polymer exits said extruder and wherein said crosslinking agent and said polymer are mixed with a static mixer.

4. The process of claim 1 wherein said crosslinking agent is made from reacting a polyester or polyether hydroxyl terminated polyol and diisocyanate.

5. The process of claim 4 wherein said crosslinking agent has a number average molecular weight of from about 1,500 to about 2,800 Daltons.

6. The process of claim 1 wherein said bobbins are wound at a speed of from about 100 to about 3000 meters per minute.

7. The process of claim 6 wherein said bobbins are wound at a speed of from about 300 to about 1200 meters per minute.

8. The process of claim 1 wherein said fibers have a size less than 240 denier.

9. The process of claim 8 wherein said fibers have a size of from about 10 to less than about 240 denier.

10. The process of claim 2 wherein said dynamic mixer is attached to the exit end of said extruder.

11. The process of claim 10 wherein said dynamic mixer comprises a feed screw, a barrel and mixing pins, wherein said feed screw rotates within said barrel and said mixing pins are attached to said barrel and extending toward the centerline of said feed screw.

12. The process of claim 1 wherein said melted polymer and said crosslinking agent have reached greater than 20 percent reaction completion as they exit said spinneret, as evidenced by the disappearance of NCO groups.

13. The process of claim 12 wherein reaction is from about 40 percent to about 50 percent complete.

* * * * *